(12) United States Patent
Lee et al.

(10) Patent No.: US 6,377,555 B1
(45) Date of Patent: Apr. 23, 2002

(54) METHOD FOR DETERMINING FORWARD LINK CHANNEL POWERS FOR A CDMA CELLULAR OR PCS SYSTEM

(76) Inventors: Jhong Sam Lee, 11111 S. Glen Rd., Potomac, MD (US) 20854; Leonard E. Miller, 4310 Puller Dr., Kensington, MD (US) 20895

( * ) Notice: Subject to any disclaimer, the term of this patent is extended or adjusted under 35 U.S.C. 154(b) by 0 days.

(21) Appl. No.: 09/151,797

(22) Filed: Sep. 22, 1998

(51) Int. Cl.⁷ .............................................. H04J 13/00
(52) U.S. Cl. ..................................................... 370/252
(58) Field of Search ................................ 370/535, 537, 370/342, 347, 252, 254, 320, 311, 329, 332, 333, 334, 335, 337, 441, 442, 464, 465, 503, 324; 375/130, 133; 455/38.3, 450, 452, 458, 38.1, 524, 525, 516, 515, 501

(56) References Cited

U.S. PATENT DOCUMENTS

| | | |
|---|---|---|
| 5,056,109 A | 10/1991 | Gilhousen et al. |
| 5,093,840 A | 3/1992 | Schilling |
| 5,103,459 A | 4/1992 | Gilhousen et al. |
| 5,128,965 A | 7/1992 | Henriksson |
| 5,216,692 A | 6/1993 | Ling |
| 5,257,283 A | 10/1993 | Gilhousen et al. |
| 5,265,119 A | 11/1993 | Gilhousen et al. |
| 5,267,262 A | 11/1993 | Wheatley et al. |
| 5,299,226 A | 3/1994 | Schilling |
| 5,383,219 A | 1/1995 | Wheatley et al. |
| 5,396,516 A | 3/1995 | Padovani et al. |
| 5,461,639 A | 10/1995 | Wheatley et al. |
| 5,539,728 A | 7/1996 | Gaiai et al. |
| 5,596,570 A * | 1/1997 | Soliman ..................... 370/252 |
| 5,604,766 A | 2/1997 | Dohi et al. |
| 5,623,486 A | 4/1997 | Dohi et al. |
| 5,669,066 A | 9/1997 | Borg et al. |

OTHER PUBLICATIONS

J.S. Lee and Miller, CDMA Systems Engineering Handbook (Artech House, 1998; Ch. 10, 11).
J.S. Lee and L.E. Miller, "Dynamic Allocation of CDMA Forward Link Power for PCS and Cellular Systems," Proceedings 2nd CDMA International Conference, Oct. 21–24, 1997, Seoul, Korea.
A.J. Viterbi, CDMA: Principles of Spread Sprectrum Communication (Addison–Wesley, 1995; Section 6.7.1).

* cited by examiner

Primary Examiner—Dang Ton
(74) Attorney, Agent, or Firm—Banner & Witcoff, Ltd.

(57) ABSTRACT

A method for determining the amounts of channel powers in the orthogonally multiplexed forward link of a CDMA cellular telephone or PCS system required to provide sufficiently high signal levels for these channels at the location of a mobile telephone receiver at or near the edge of the cell. The method first formulates the power requirements for the several types of forward link channels as a system of equations in the with the powers as variables, parametric in several parameters, including the number of active traffic channels, that vary with time. The method then proceeds to solve the system of equations to determine time varying powers of the pilot, synchronization, and paging channels; it also determines a value of the required power for a traffic channel that is useful for initializing the existing closed loop forward traffic channel power control of the system.

10 Claims, 6 Drawing Sheets

METHOD FOR DETERMINING FORWARD LINK CHANNEL POWERS FOR A CDMA CELLULAR OR PCS SYSTEM

BACKGROUND OF THE INVENTION

1. Field of the Invention

The present invention relates to cellular telephone and personal communication services (PCS) systems using code division multiple access (CDMA) techniques. More specifically, the present invention relates to a novel and improved method for determining the required amount of forward link channel powers for a CDMA cellular or PCS system in which the forward link channels are orthogonally multiplexed, so that forward link interference in the system is kept to a minimum by using only the required amount of power for each channel.

2. Description of the Prior Art

In a cellular system, each base station transmitter is intended to provide a reliable and sufficiently strong signal level to mobile receivers in a given area (cell), but not to mobile receivers in other cells. However, it is physically impossible to prevent the signal from propagating to adjacent cells, thereby causing interference to the base station signals in those areas. This other-cell forward link interference imposes a fundamental limitation on the performance of the system with regards to capacity, since the maximum number of mobile users is inversely proportional to the amount of interference from any channel.

For the synchronization (sync) channel of a CDMA cellular system, for example, the power delivered by the base station power amplifier, denoted as $P_2$, is subject to various system losses and gains, including propagation loss and transmitter and receiver antenna gains, before reaching the input of a mobile receiver. Thus the power at the in put of a mobile receiver is $P_2/L$, where L denotes the net loss on the link. Since the sync channel signal is intended to be received by any mobile user in the cell, L is the net loss at a distance equal to the call radius, i.e. the distance to the cell edge. In order to ensure satisfactory operation of the sync channel, the ratio of received sync channel power to the sum of noise and interference power at the receiver must exceed a certain amount as per the following:

$$g_2 P_2/L \div (N_m + I_T) \geq \rho_2 \quad (1)$$

where $N_m$ is the receiver thermal noise power, $I_T$ is the total interference power at mobile receiver input, $\rho_2$ is the required bit energy-to-noise density ratio for the sync channel, and $g_2$ is the spread spectrum processing gain for the sync channel. The total interference power includes interference from other cells and interference from the same cell as per the following:

$$I_T = I_{other} + I_{same} \quad (2)$$

The primary component of the interference power at a mobile receiver located at the edge of the cell is due to base station signals from adjacent cells, since in a CDMA system each cell uses the same frequency band. In lieu of a measurement, it is common in CDMA cellular engineering to assume that each base station emits the same amount of total power. It is also common to estimate the amount of other-cell interference at the cell edge as a factor, $K_{other}$ times the total forward link power received from the mobile's own base station as per the following:

$$I_{other} = K_{other} P_t/L \quad (3)$$

where $P_t$ denotes the total forward link power of a base station, which is the sum of the powers of the orthogonally multiplexed forward link channels. Studies have shown that the worst case value of $K_{other}$ for a hexagonal pattern of cells is on the order of 1.8 or 2.5 dB.

In a CDMA cellular system, ideally there is no same-cell interference on the forward link because the different channels are orthogonally multiplexed. However, same-cell interference can exist on the forward link due to multi-path receptions of the total forward link waveform at a particular location. In lieu of a measurement, it is convenient to model the amount of same-cell interference at the cell edge as a factor, $K_{same}$, times the total received forward link power as per the following:

$$I_{same} = K_{same} P_t/L \quad (4)$$

The amount of forward link multi-path interference varies from place to place. It is common in CDMA cellular engineering to conservatively estimate that the total same-cell interference power from one or more multi-path receptions is equal to the power of the main or direct path, so that the value $K_{same}=1$ is often used. The other-cell interference and the same-cell interference have the same form and it is therefore possible to characterize the total interference using a factor, $K_f = K_{same} = K_{other}$, to express the total interference as a multiple of the received power as per the following:

$$I_T = K_f P_t/L \quad (5)$$

It is clear that if the interference power increases, the base station power must be increased in order to maintain the same value of the power ratio. However, increasing power at one base station results in more interference to mobile users in adjacent cells.

A preferred method, which is in accordance with the cellular concept, is to minimize forward link interference by using as little base station transmitter power as possible while maintaining reliable signal levels at the intended receiver locations. However, in order to implement such a method, it is necessary to use some method for adapting the transmitter power of each forward link channel to the interference situation in such a way as to use only the required amount of power for that channel.

For example, U.S. Pat. No. 5,103,459 describes a system for implementing a CDMA cellular telephone system in which the forward link transmissions from the base station to the several mobile receivers are one-to-many transmissions of a single waveform comprised of the orthogonally combined (multiplexed) transmissions to particular mobile users, as well as signaling channels broadcast to all active mobile users and to areas of the cell or cellular sector in which potential mobile users may be located. The system described above subsequently embodied in the industry standard IS-95, features four types of forward link channels: (1) a pilot channel consisting of a spread spectrum pseudo noise (PN) coded waveform with no modulation, which is a signaling channel designed to facilitate acquisition of the base station signal by a mobile user; (2) a synchronization channel consisting of the same PN coded waveform as the pilot channel but modulated with timing and other data needed as a signaling channel to set up the mobile unit for further activity in the system; (3) one or more paging channels that are signaling channels available to the base station for transmitting various messages to particular mobile units by modulating the same PN coded waveform used as the pilot channel; and (4) one or more traffic channels that carry digital voice data modulated onto the PN coded waveform. However, such system does not describe implementation of gain control or a method for determining the values of the channel powers that dictate what the channel gains should be.

Furthermore, with regards to the non-full duplex forward link signaling channels of a CDMA cellular system, including the pilot, sync, and paging channels, there is no provision built into the system for adaptively controlling transmitted power based on feedback from mobile receivers. Since it is necessary to increase or decrease signaling channel powers as interference increases or decreases, there arises the need for an auxiliary method for adjusting the power in the forward link signaling channels quickly and without consuming additional communication resources.

A common method calls for CDMA operators to assign the pilot channel and other signaling channel powers fixed percentages of the total forward link power, as suggested in the book *CDMA: Principles of Spread Spectrum Communication*, by A. J. Viterbi, and in the paper "on the Capacity of a Cellular CDMA System," by K. S. Gilhousen et al. Using this method, the signaling channel powers are made proportional to the number of active traffic channels, since total power increases with the number of active channels. In this manner, the signaling channel powers are automatically increased when there is more interference, an adaptation that is needed to combat the increased interference. However, it can be shown that the optimum values of the percentages of total power for the signaling channels, which ensure the minimum amount of power is used, are not fixed but vary adaptively as a function of cell traffic and other parameters.

SUMMARY OF THE INVENTION

Therefore, the present invention is directed to a method, in connection with a base station transmitter, for adaptively determining the CDMA forward link channel power requirements to further determine the amount of power required for each channel in the CDMA system, to thereby control the power to minimize forward link interference.

More specifically, the present invention is directed to a method of adaptively determining the optimal amount of power for every forward link channel in a CDMA system using orthogonally multiplexed channels. According to the method of the present invention, a base station transmitter is provided a system of equations in which forward link energy-to-noise density requirements are modeled for every signaling channel of the CDMA system and for a traffic channel directed to a cell edge of the CDMA system. The equations are then solved to determine the respective channel power for each of the signaling channels and the traffic channel to thereby minimize forward link interference by using only the required amount of power for each channel, and the necessary channel gain is then determined for each of the signaling channels and the traffic channel by utilizing the solved system of equations. This determination is made, and the powers changed, on a frequently period basis in order to maintain the correct amounts of power as conditions change.

The system of equations solved in the base station transmitter considers the following variables: desired energy-to-noise density ratio values for each channel type, spread spectrum processing gains for each channel type, net loss experienced by the base station transmitter when processing from an amplifier output thereof to an input terminal of a mobile receiver at the respective cell edge, thermal noise power at the mobile receiver, the number of active CDMA paging channels, an average forward link traffic channel voice activity factor, a forward link same-cell interference factor, the number of active traffic channels, a forward link power control factor, a forward link other-cell interference factor at the cell edge and total forward link traffic channel power.

BRIEF DESCRIPTION OF THE DRAWINGS

The features and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT

To determine the CDMA forward link channel power requirements to further determine the amount of power required for each channel in a CDMA system, a system of equations utilizing the following notations is utilized:

$P_1$ = Transmitter power for the pilot channel $P_2$ = Transmitter power for the synchronization channel $P_3$ = Transmitter power for a paging channel $N_p$ = Number of active paging channels $P_4$ = Transmitter power for a traffic channel directed to a user at the cell edge $M$ = Number of active traffic channels $P_t$ = Total forward link transmitter power $P_{tt}$ = Total traffic channel power $L$ = Net link loss, including propagation, antenna gains, cable loss, etc.

-continued

| | | |
|---|---|---|
| $N_m$ | = | Noise power in mobile receiver bandwidth |
| $K_f$ | = | Forward link interference factor |
| $K_{traf}$ | = | Forward link traffic channel power control factor |
| $I_T$ | = | Total forward link interference power at the cell edge |
| $\alpha$ | = | Average voice activity factor for the traffic channels |
| $\rho_1$ | = | Required pilot channel chip energy-to-noise density ratio, including margin |
| $\rho_2$ | = | Required sync channel bit energy-to-noise density ratio, including margin |
| $\rho_3$ | = | Required paging channel bit energy-to-noise density ratio, including margin |
| $\rho_4$ | = | Required traffic channel bit energy-to-noise density ratio, including margin |
| $g_1$ | = | Pilot channel spread spectrum processing gain ( = 1 in IS – 95 system) |
| $g_2$ | = | Sync channel spread spectrum processing gain ( = 1024 in IS – 95 system) |
| $g_3$ | = | Paging channel spread spectrum processing gain ( = 256 in IS – 95 system) |
| $g_4$ | = | Traffic channel spread spectrum processing gain ( = 128 in IS – 95 system). |

The energy-to-noise density ratios $\{\rho_i, i=1, 2, 3, 4\}$ include a margin in the sense that the selected value based on channel error rate requirements is increased by a factor greater than one in order to compensate for the fact that received signal levels may fluctuate due to variations in the net loss.

With these definitions, the received forward link power at the cell edge is $P_t/L$, and the amount of forward link interference power is estimated as $I_T = K_f P_t/L$, which defines the interference factor $K_f$.

The total forward link power $P_t$ is given as follows:

$$P_t = P_1 + P_2 + N_p P_3 + P_{tt} = P_1 + P_2 + N_p P_3 + K_{traf} M\alpha P_4 \quad (1)$$

In this expression, the total traffic power $P_{tt}$ is modeled as $$P_{tt} = K_{traf} M\alpha P_4, \quad (2)$$

which is the number of active traffic channels times the traffic channel power for a mobile user at the cell edge, reduced by the voice activity factor (power is dynamically adjusted by the CDMA system in proportion to the data rate) and by a "forward link traffic channel power control factor." This power control factor is less than one because the M mobile users are distributed at la various distances from the base station, each requiring power in proportion to its distance from the base station, and the closed loop power control for the forward link causes the actual power for an individual traffic channel to be close to its required value.

Given these physical models for forward link signal, noise, and interference powers at a mobile receiver, all of which are amenable to measurement, it is possible to formulate equations that express the values of the energy-to-noise density ratios for each type of forward link channel at the receiver of a mobile station located near the edge of a cell. Combined with required values for the ratios, which are based on theoretical and experimental results for the performance of the channels in terms of demodulator error rates, the equations form a theoretical basis for determining the required forward link transmitter powers. That is, the required amount of power required for the forward link channels to minimize forward link interference and provide satisfactory reception at the cell edge for the different types of forward link channels is expressed by the following constraints:

| | | |
|---|---|---|
| (3) | $(g_1 P_1/L)/(N_m + I_t) \geq \rho_1$ | for the pilot channel |
| (4) | $(g_2 P_2/L)/(N_m + I_t) \geq \rho_2$ | for the sync channel |
| (5) | $(g_3 P_3/L)/(N_m + I_t) \geq \rho_3$ | for a paging channel |
| (6) | $(g_4 P_4/L)/(N_m + I_t) \geq \rho_4$ | for a traffic channel to the cell edge. |

In the absence of interference ($I_T=0$), clearly each channel power is independently constrained to be greater than some minimum value. However, since interference is a function of the total power transmitted, it is evident that generally the four power ratio constraints for the channel powers described above are interdependent. Taking the case of equality (minimum required power), the four power ratio constraints may be formulated as a system of equations in the variables $P_1$, $P_2$, $P_3$, and $P_4$.

Figure 2:
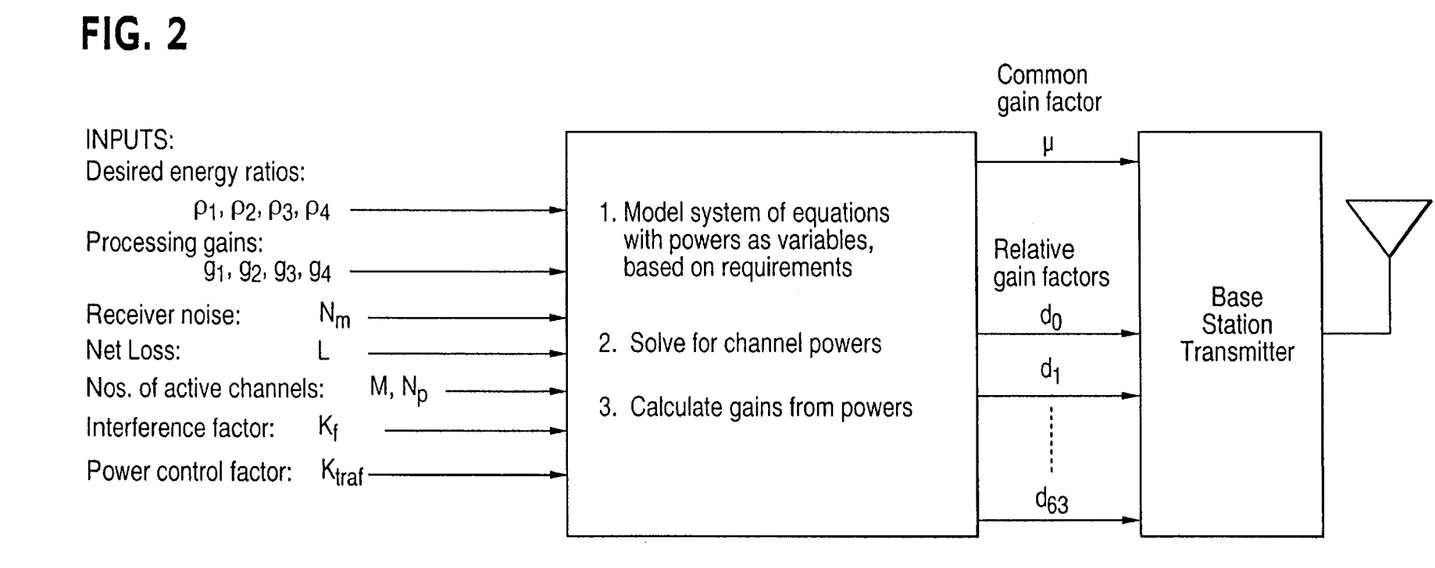
FIG. 2 is a block diagram of an embodiment of the base station transmitter of the present invention for computing channel gain factors utilizing estimates of total traffic power and total interference power at the cell edge.

The method of the present invention utilizes different assumptions to solve for the channel powers for use by the CDMA system's control subsystem in setting the gain for the signaling channels and optionally in initializing the closed loop gain control for a traffic channel at the beginning of a call. The method addresses four cases, referring to FIGS. 2–5 respectively, based on different assumptions:

(a) Case 1: Total traffic power and total interference power are modeled as discussed above.

Figure 3:
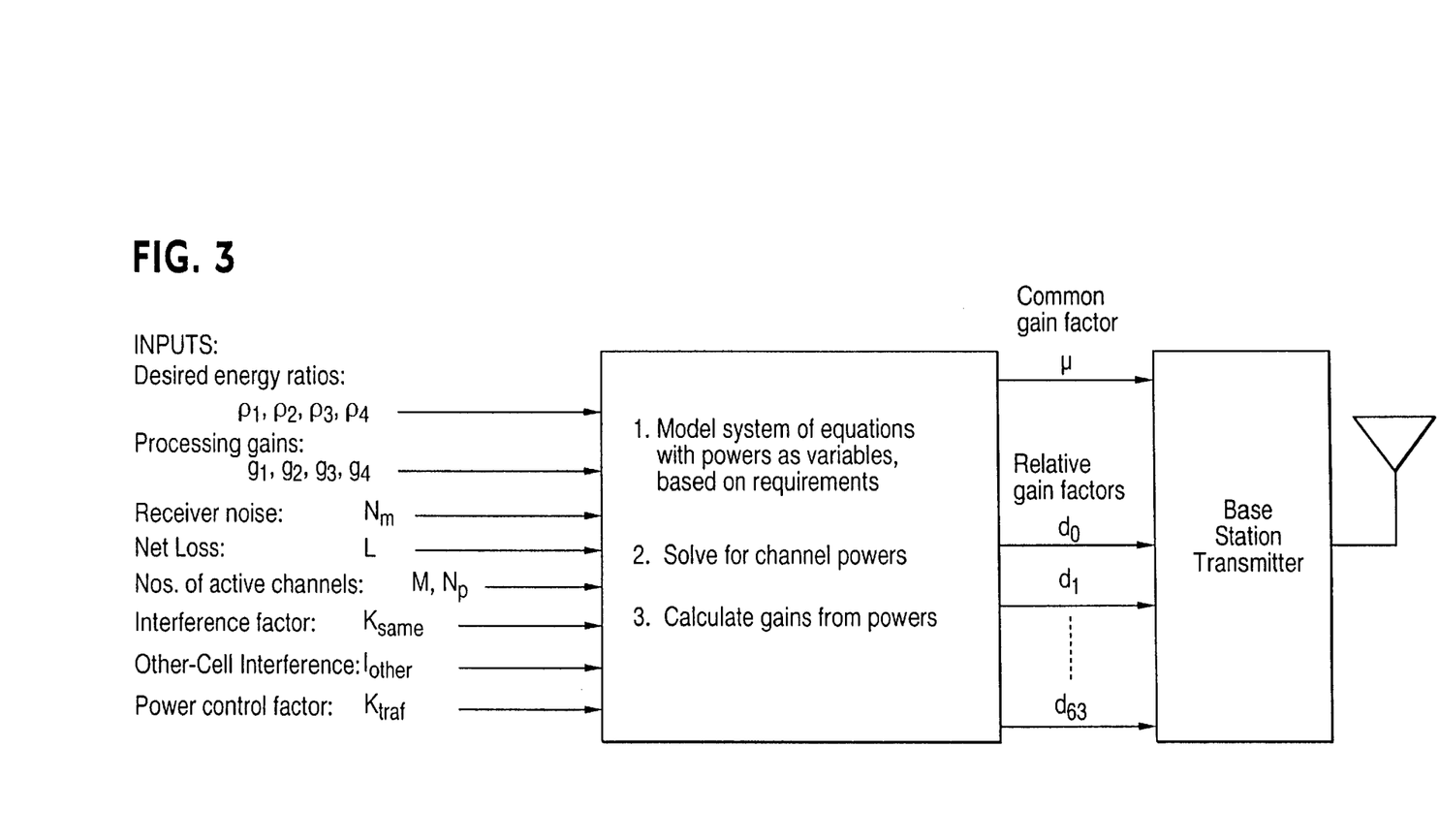
FIG. 3 is a block diagram of an embodiment of the base station transmitter of the present invention for computing channel gain factors utilizing estimates of total traffic power and same-cell interference power at the cell edge, and a measurement of other-cell interference power.

(b) Case 2: Total traffic power and same-cell interference are modeled as discussed above, but the other-cell interference is measured.

Figure 4:
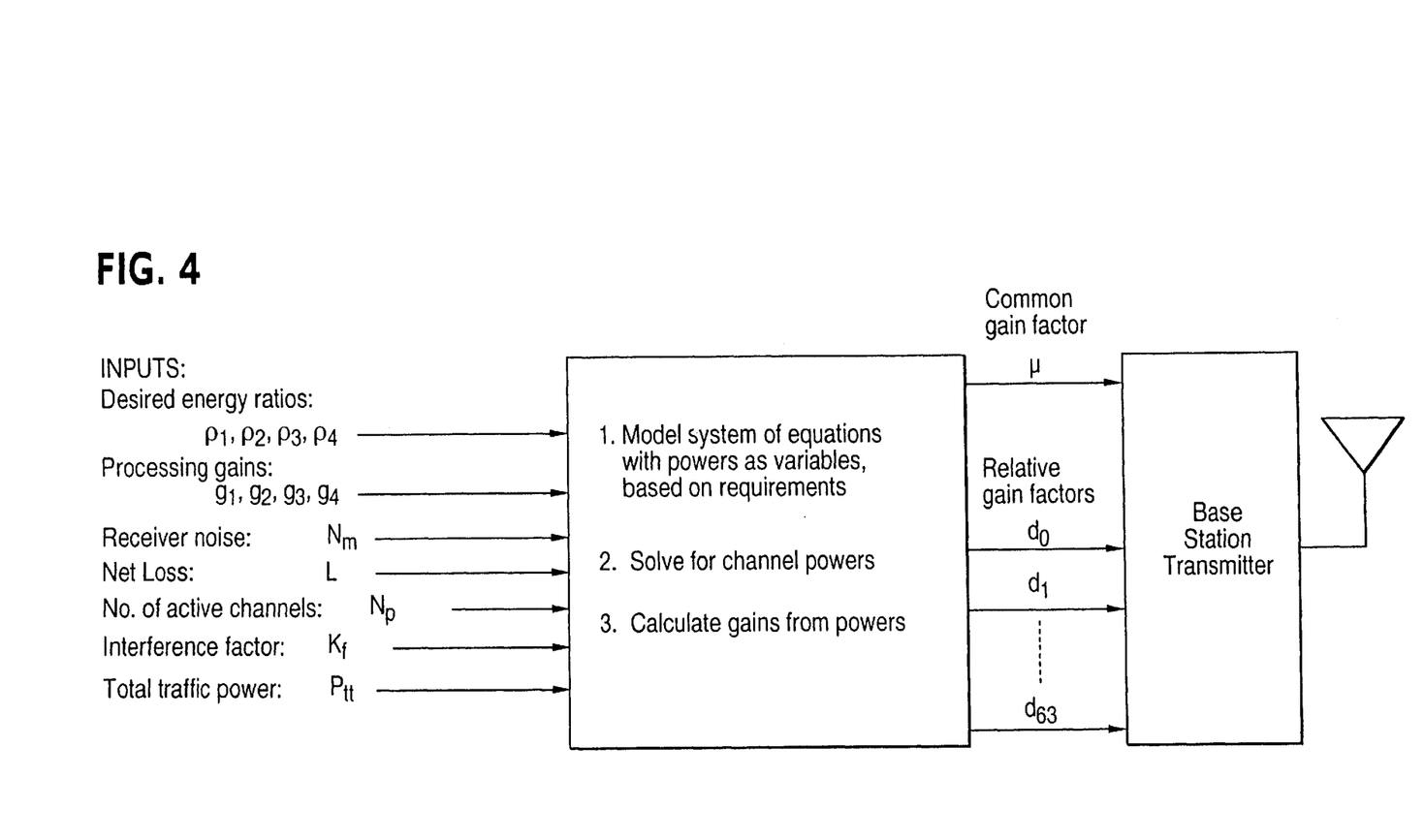
FIG. 4 is a block diagram of an embodiment of the base station transmitter of the present invention for computing channel gain factors utilizing an estimate of total interference power at the cell edge and a measurement of total traffic power.

(c) Case 3: Total traffic power is measured, while total interference power is modeled as discussed above.

Figure 5:
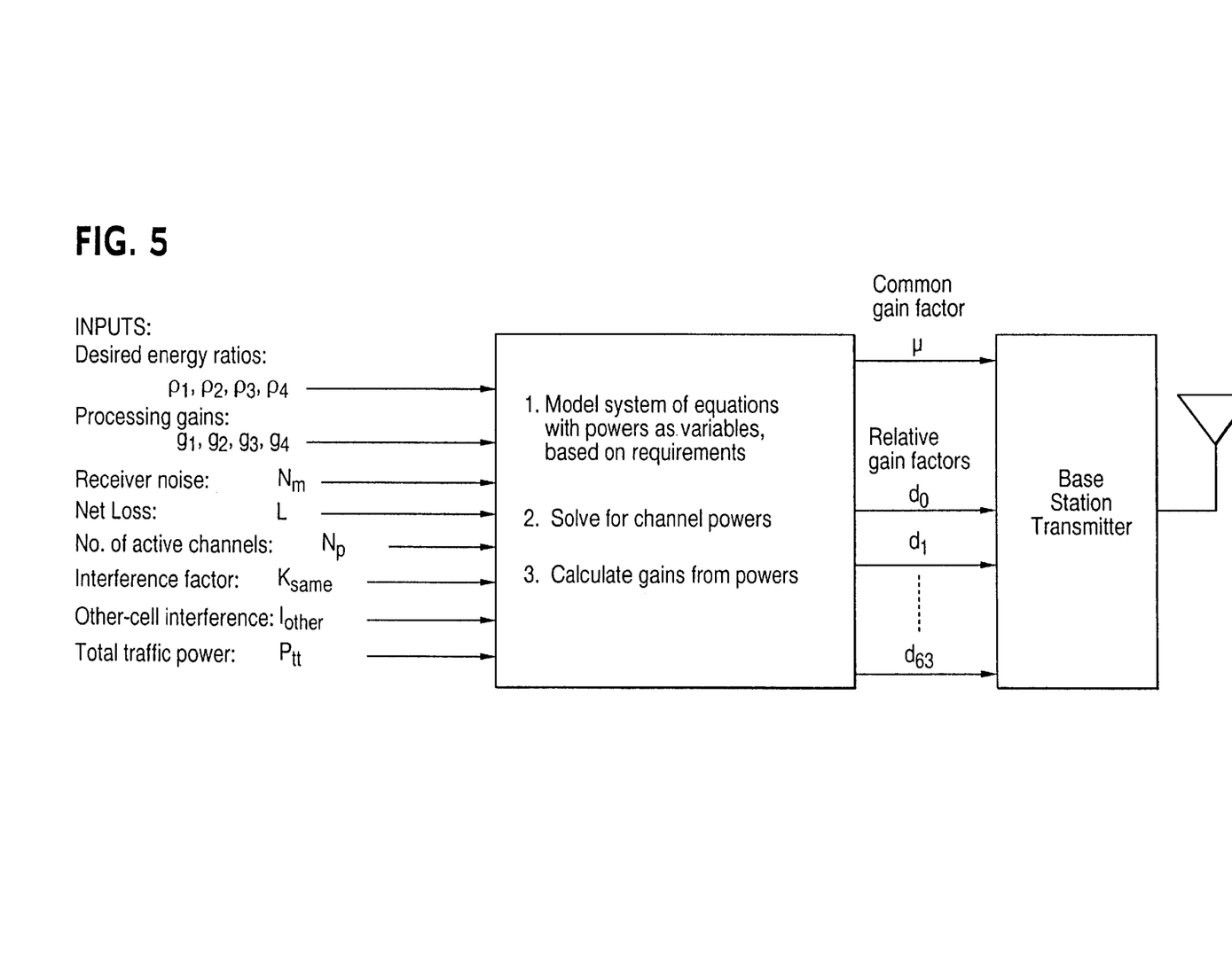
FIG. 5 is a block diagram of an embodiment of the base station transmitter of the present invention for computing channel gain factors utilizing an estimate of same-cell interference at the cell edge and measurements of other-cell interference and total traffic power.

(d) Case 4: Total traffic power and other-cell interference are measured, while same-cell interference is modeled as discussed above.

Figure 1:
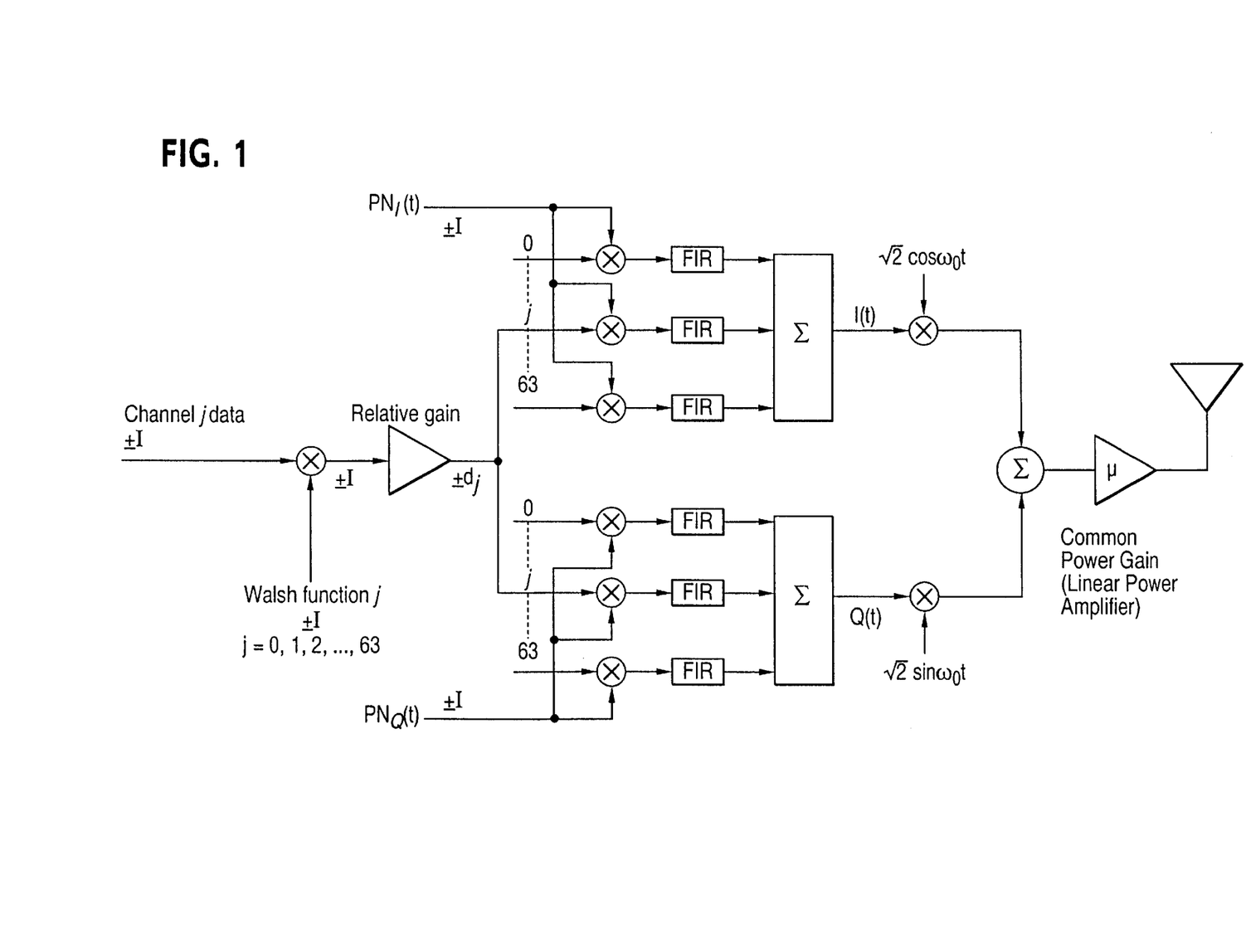
FIG. 1 is a block diagram of a CDMA forward link power control in accordance with the present invention, as embodied in a base station transmitter of a typical CDMA cellular system.

More specifically, in a CDMA cellular system using orthogonally multiplexed channels on the forward link, the forward link waveform is synthesized as the modulation of in-phase (I) and quadrature (Q) RF carriers respectively by I and Q quadrature channel waveforms, denoted I(t) and Q(t) in FIG. 1. The quadrature baseband waveforms themselves are the superposition of filtered pseudo noise (PN) code sequences modulated by up to 64 orthogonalized baseband data waveforms, always including a pilot and sync channel and up to 62 other channels, which may be paging channels or traffic channels. In principle, because of the filtering, the waveforms are analog and continuous; however, in the preferred embodiment they are generated as non-binary sampled values that are calculated, scaled, and combined in digital form by application-specific integrated circuit (ASIC) devices, then converted to analog form just prior to the quadrature carrier modulation and power amplification shown in FIG. 1. For the purpose of describing the features of the present invention, FIG. 1 prominently indicates that the linear nature of the forward link waveform synthesis permits the scaling of each channel on an individual channel basis. FIG. 1 shows a representative channel, channel j, whose unit bipolar data sequence is combined with an assigned Walsh function sequence to render the resultant baseband data sequence orthogonal to the other baseband data sequences which have been similarly combined with different Walsh functions. FIG. 1 further indicates that a "relative gain" factor of $d_j$ may be applied to the channel j baseband data waveform and that a "common power gain" factor of $\mu$ may be applied to the combined RF waveform. The gain control of the power amplifier is indicated in FIG. 1, by the common gain factor shown inside the amplifier symbol. In the preferred embodiment, the relative gain factors are simply scale factors applied in the digital calculation of the waveform sampled values, while the common gain is an analog voltage (generated by digital calculations) that is applied to a voltage gain-controlled amplifier to control the power of the emitted composite signal, using amplifier gain-control techniques that are well known in the art of RF engineering. Thus each channel in principle may have a different net voltage gain given by $d_j$ times the square-root of $\mu$, and therefore a different amount of output power.

The present invention relates to a method for determining the desired values of the channel output powers, which for a given CDMA base station transmitter determines the desired values of the voltage gains. Since the solutions for the channel powers below have a common factor, it is possible, though not necessary, to identify the common factor with the common gain indicated in FIG. 1.

The preferred embodiment of the invention may be described as a method implemented in a CDMA base station transmitter which may be added in the form of computer instructions and measurement capabilities to the CDMA cellular system to calculate optimum channel powers and gains for use with the gain control capability that is already provided for in the system design. The application of the method disclosed in the present invention is flexible regarding the rate at which the calculations are updated as the activity in the forward link channels varies with time. Also, some quantities used in the calculations, including the number of active users, change value rapidly and/or are statistical in nature, and the application of the method involves using average values of the quantities.

Figure 6:
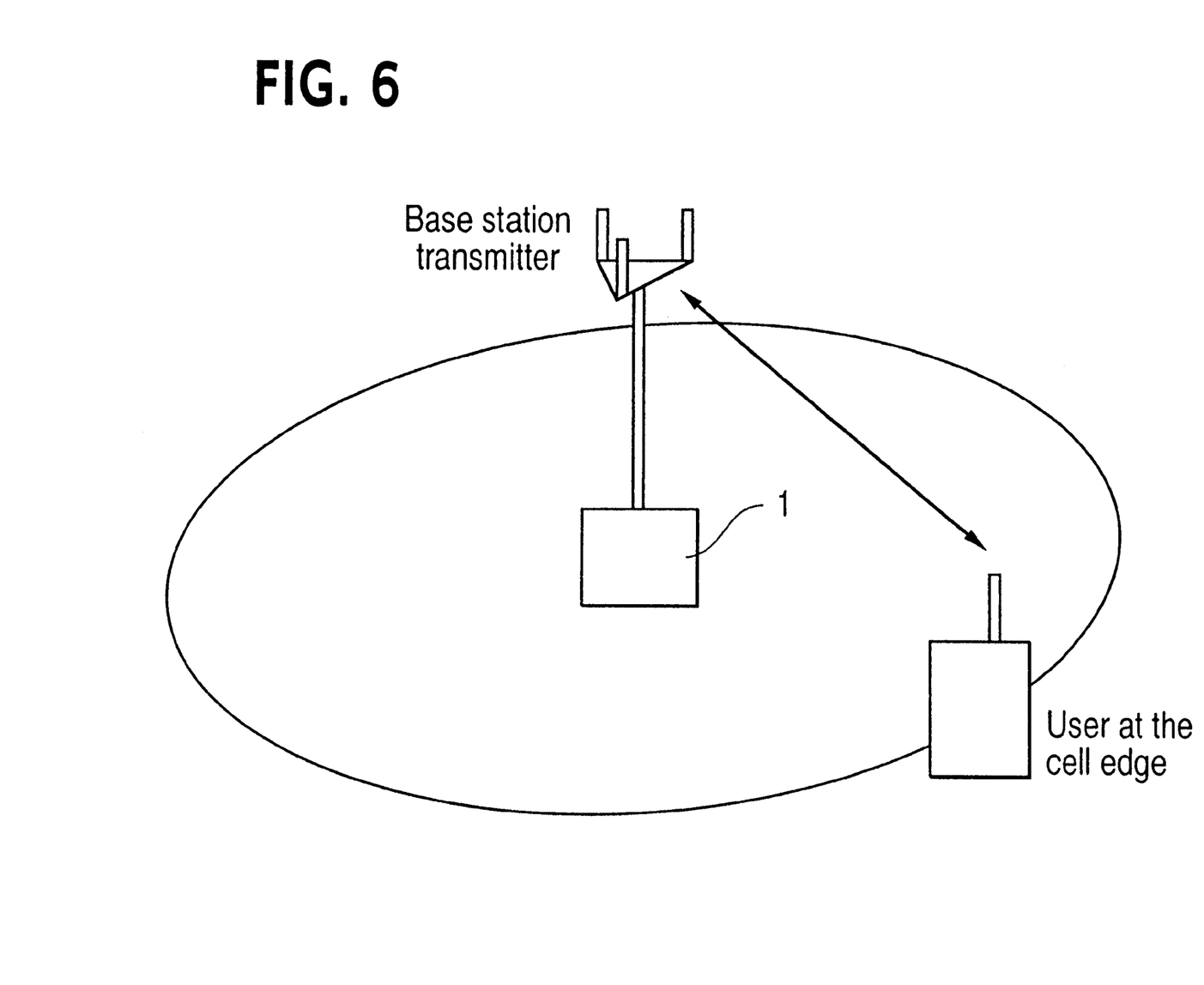
FIG. 6 is a schematic diagram illustrating an environment for a practical application of the present invention, including a base station transmitter of a particular cell.

FIG. 6 illustrates an example of a CDMA transmission environment, to which the present invention can be applied. In particular, the base station transmitter 1 employs the method of the present invention to determine the CDMA forward link channel power requirements to further determine the amount of power required for each channel, thus controlling the power to minimize forward link interference.

Case 1 Embodiment

The preferred method for the assumptions of Case 1 includes the first step is to model the forward link channel power requirements in the base station transmitter by the following system of equations, which solve for the channel power variables $P_1$, $P_2$, $P_3$, $P_4$ and $P_t$ defined above:

$$g_1 P_1 \div (N_m + I_T) = \rho_1 \tag{7}$$

$$g_2 P_2 \div (N_m + I_T) = \rho_2 \tag{8}$$

$$g_3 P_3 \div (N_m + I_T) = \rho_3 \tag{9}$$

$$g_4 P_4 \div (N_m + I_T) = \rho_4 \tag{10}$$

$$I_T = K_f P_t / L \tag{11}$$

$$P_t = P_1 + P_2 + N_p P_3 + K_{traf} M \alpha P_4 \tag{12}$$

In the second step of the method, the system of equations is solved in the base station transmitter to obtain the channel powers given by the following expression:

$$P_i = v \rho_i / g_i, \; i=1, 2, 3, 4 \tag{13}$$

where the common factor v is given by $$v = N_m L \div \{1 - K_f (\rho_1/g_1 + \rho_2/g_2 + N_p \rho_3/g_3 + K_{traf} M \alpha \rho_4/g_4)\}. \tag{14}$$

Since the solutions to the equations are given in the form of (13), in the preferred embodiment of the invention the modeling and solution steps of the method are implemented by calculating (13) for each type of channel. If the system software that determines the individual channel powers is set up to generate channel power factors as fractions of total power, it is staightforward to convert the set of solutions expressed by (13) into a set of individual channel power fractions plus an expression for total power. Thus, as number of mobile users increases, and consequently the interference increases, all of the forward link channels increase by the same factor. It follows that the fraction of the total power allocated to the pilot channel is given by:

$$\zeta_p = P_1/P_t = (\rho_1/g_1) \div (\rho_1/g_1 + \rho_2/g_2 + N_p \rho_3/g_3 + K_{traf} M \alpha \rho_4/g_4) \tag{15}$$

which indicates that the optimal value of the pilot power fraction is not fixed but is a quantity that is a function of the number of active traffic channels; more specifically, the pilot power increases when M increases, but the pilot power fraction decreases. Thus, using the method shown here for determining the amount of pilot power will produce less forward link interference power than the method of assigning a fixed percentage of the total forward link power to the pilot channel. FIG. 2 illustrates the application of the Case 1 embodiment to a base station transmitter of the CDMA system, wherein the inputs to the power and gain calculations include the following information:

(1) the desired channel energy-to-noise density ratios (including any margins) and the channel processing gains;

(2) the mobile receiver noise power;

(3) the value of net loss experienced by a signal from the base station power amplifier output to the receiver input of a mobile terminal at the cell edge;

(4) the numbers of active paging and traffic channels;

(5) an assumed or measured value for the average forward traffic channel voice activity factor;

(6) an assumed or measured value for the forward link traffic channel power control factor; and (7) an assumed or measured value for the forward link interference factor.

In the book, *CDMA Systems Engineering Handbook*, it is shown that a conservative value for the traffic channel power control factor is $K_{traf}$=0.5.

In this and the other forms of the preferred embodiment, it is realized that the propagation loss to different positions on the cell edge varies due to shadowing and other effects; thus a median or worst-case value of net loss is understood to be used, depending on the availability of this information. The margins for the channels are adjusted appropriately, with a higher margin being used if a median value of net loss is used and a lower margin being used if a worst case value of net loss is used. Also, the application of the power calculations to the traffic channels is optional, since the CDMA system already has a means for adapting the traffic channel power to the conditions. Finally, the "measured" value of the forward link traffic channel power control factor may be determined as the sum of the actual traffic channel powers, divided by the number of active traffic channels and divided by the maximum of the actual traffic channel powers.

Case 2 Embodiment

The preferred method for the assumptions of Case 2 includes the first step of modeling the forward link channel power requirements as follows, which solve for the channel power variables $P_1$, $P_2$, $P_3$, $P_4$ and $P_t$ defined above:

$$g_1 P_1 \div (N_m + I_T) = \rho_1 \tag{16}$$

$$g_2 P_2 \div (N_m + I_T) = \rho_2 \tag{17}$$

$$g_3 P_3 \div (N_m + I_T) = \rho_3 \tag{18}$$

$$g_4 P_4 \div (N_m + I_T) = \rho_4 \tag{19}$$

$$I_T = I_{other} + K_{same} P_t / L \tag{20}$$

$$P_t = P_1 + P_2 + N_p P_3 + K_{traf} M \alpha P_4. \tag{21}$$

In the second step of the method, the channel powers are obtained as follows:

$$P_i = w \rho_i / g_i, \; i=1, 2, 3, 4 \tag{22}$$

where the common factor w is given by $$w = (N_m + I_{other}) L \div \{1 - K_{same}(\rho_1/g_1 + \rho_2/g_2 + N_p \rho_3/g_3 + K_{traf} M \alpha \rho_4/g_4)\}. \tag{23}$$

Once again, as the number of mobile users increases, and consequently the interference increases, all of the forward link channels increase by the same factor. The fraction of the total power allocated to the pilot channel is given by the same expression as in Case 1.

FIG. 3 illustrates the application of the Case 2 embodiment to a base station transmitter of the CDMA system, wherein the inputs to the power and gain calculations include of the following information:

(1) the desired channel energy-to-noise density ratios (including any margins) and the channel processing gains;

(2) the mobile receiver noise power;

(3) the value of net loss experienced by a signal from the base station power amplifier output to the receiver input of a mobile at the cell edge;

(4) the numbers of active paging and traffic channels;

(5) an assumed or measured value for the average forward traffic channel voice activity factor;

(6) an assumed or measured value for the forward link traffic channel power control factor;

(7) an assumed or measured value for the forward link same-cell interference factor; and (8) an estimate or measurement of the other-cell interference at the cell edge.

Case 3 Embodiment

The preferred method for the assumptions of Case 3 includes the first step of modeling the forward link channel power requirements as follows, which solve for the channel power variables $P_1$, $P_2$, $P_3$, $P_4$ and $P_t$ defined above:

$$g_1 P_1 \div (N_m + I_T) = \rho_1 \tag{24}$$

$$g_2 P_2 \div (N_m + I_T) = \rho_2 \tag{25}$$

$$g_3 P_3 \div (N_m + I_T) = \rho_3 \tag{26}$$

$$I_T = K_f P_t / L \tag{27}$$

$$P_t = P_1 + P_2 + N_p P_3 + P_{tt} \tag{28}$$

Such formulation does not include the variable $P_4$ for the transmitter power for a traffic channel directed to a user at the cell edge. In the second step of the method, the system of equations is solved to obtain the channel powers as follows:

$$P_i = x \rho_i / g_i, \; i=1, 2, 3, 4 \tag{29}$$

where the common factor x is given by $$x = (N_m L + K_f P_{tt}) \div \{1 - K_f(\rho_1/g_1 + \rho_2/g_2 + N_p \rho_3/g_3)\}. \tag{30}$$

In the solution, the index value i=4 is included to give $P_4$ as an estimate of the power required for a traffic channel directed to the edge of the cell. From the expression for the common factor x, the channel powers increase with the number of active paging channels in the same way as for Cases 1 and 2, but the increase with the number of active traffic channels is different due to an increase in the total traffic channel power in the numerator of the expression. The fraction of the total power allocated to the pilot channel in Case 3 is given by:

$$\zeta_p = P_1/P_t = (\rho_1/g_1) \div (\rho_1/g_1 + \rho_2/g_2 + N_p \rho_3/g_3 + P_{tt}/x). \tag{31}$$

The pilot fraction for this case is similar to that for Case 1, but with the term involving $\rho_4$ replaced by an equivalent measurement-based value.

FIG. 4 illustrates the application of the Case 3 embodiment to a base station transmitter of the CDMA system, wherein the inputs to the power and gain calculations include the following information:

(1) the desired channel energy-to-noise density ratios (including any margins) and the channel processing gains;

(2) the mobile receiver noise power;

(3) the value of net loss experienced by a signal from the base station power amplifier output to the receiver input of a mobile at the cell edge;

(4) the number of active paging channels;

(5) an assumed or measured value for the average forward traffic channel voice activity factor;

(6) an assumed or measured value for the forward link interference factor; and (7) an estimate or measurement of the total forward link traffic channel power.

Case 4 Embodiment

The preferred method for the assumptions of Case 4 includes the first step of modeling the forward link channel power requirements as follows:

$$g_1 P_1 \div (N_m + I_T) = \rho_1 \tag{32}$$

$$g_2 P_2 \div (N_m + I_T) = \rho_2 \tag{33}$$

$$g_3 P_3 \div (N_m + I_T) = \rho_3 \quad (34)$$

$$I_T = I_{other} + K_{same} P_t / L \quad (35)$$

$$P_t = P_1 + P_2 + N_p P_3 + P_{tt} \quad (36)$$

Note that this formulation does not include the variable $P_4$. In the second step of the method, the system of equations is solved to obtain the channel powers given as follows:

$$P_i = y \rho_i / g_i, \, i=1, 2, 3, 4 \quad (37)$$

where the common factor y is given by:

$$y = \{(N_m + I_{other}) L + K_{same} P_{tt}\} \div \{1 - K_{same}(\rho_1/g_1 + \rho_2/g_2 + N_p \rho_3/g_3)\}. \quad (38)$$

In the solution, the index value i=4 is included to provide $P_4$ as an estimate of the power required for a traffic channel directed to the edge of the cell. The fraction of the total power allocated to the pilot channel in Case 4 is given by the same expression as for Case 3, except that x is replaced by y.

FIG. 5 illustrates the application of the Case 4 embodiment to a base station transmitter of the CDMA system, wherein the inputs to the power and gain calculations include of the following information:

(1) the desired channel energy-to-noise density ratios (including any margins) and the channel processing gains;

(2) the mobile receiver noise power;

(3) the value of net loss experienced by a signal from the base station power amplifier output to the receiver input of a mobile at the cell edge;

(4) the number of active paging channels;

(5) an assumed or measured value for the average forward traffic channel voice activity factor;

(6) an assumed or measured value for the forward link same-cell interference factor;

(7) an estimate or measurement of the total forward link traffic channel power; and (8) an estimate or measurement of the other-cell interference at the cell edge.

Third Step of Embodiment

Having obtained values of the forward link channel powers in the first two steps of the method for one of the cases discussed above, in the preferred embodiment of the invention there is a third step in which the values of the channel powers are used to determine gains for the channels. The voltage level of the bipolar logic indicated in FIG. 1 by ±1 is generalized to ±V to allow for different logic voltages in different implementations of the CDMA cellular system. Also, the power insertion loss of a finite impulse response (FIR) filter in FIG. 1 is denoted by λ. Then for channel j the equation for the transmitter power amplifier output power is as follows:

$$P_j = (V \, d_j)^2 \mu / R_{out} \lambda, \quad (39)$$

where $R_{out}$ denotes the load seen by the power amplifier and the power for channel j is one of the powers $P_1$, $P_2$, $P_3$, $P_4$ obtained by the first two steps of the method. This expression does not involve a factor of ½ because the RF power is carried by two quadrature sinusoidal carriers in the I and Q portions of the waveform. Thus the total power gain for the channel is determined by the equation as follows:

$$(d_j)^2 \mu = P_j R_{out} \lambda / V^2 \quad (40)$$

in which it is understood that the division of the gain between the individual channel gains and the common gain is an engineering design choice.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for adaptively determining, in a base station transmitter, an optimal amount of power for every forward link channel in a code division multiple access (CDMA) system using orthogonally multiplexed channels on a forward link, said method comprising the steps of:

providing a system of equations in which forward link energy-to-noise density requirements are modeled for every signaling channel of said CDMA system and for a traffic channel directed to an edge of a cell in said CDMA system, wherein each of said equations includes a channel power variable;

solving said system of equations to determine the channel power for each of said signaling channels and said traffic channel; and controlling a necessary channel gain for each of said signaling channels and said traffic channel utilizing the solved system of equations, wherein said system of equations modeling the forward link energy-to-noise density requirements for every signaling channel of said CDMA system and system traffic channel directed to an edge of a cell in said CDMA system considers the following variables:

desired energy-to-noise density ratio values for each channel type, spread spectrum processing gains for each channel type, a net loss experienced by a base station transmitter output signal when proceeding from an amplifier output of said base station to an input terminal of a mobile receiver at the cell edge in said CDMA system, thermal noise power at the mobile receiver, a number of active CDMA paging channels, an average forward link traffic channel voice activity factor, and a forward link same-cell interference factor.

2. The method of claim 1, wherein said system of equations considers the additional input of:

a number of active traffic channels, a value of a forward link power control factor, and forward link other-cell interference at the cell edge of said CDMA system.

3. The method of claim 1, wherein said system of equations considers the additional inputs of measurement or estimates of:

total forward link traffic channel power, and forward link other-cell interference at the cell edge of said CDMA system.

4. The method of claim 2 or claim 3, wherein the desired energy-to-noise density ratios are increased by margins allowing for variations in net loss and interference at different positions along the cell edge of said CDMA system.

5. The method of claim 2, wherein the solution for the traffic channel power directed to a mobile user at the cell edge of said CDMA system is used to initialize a forward link closed loop power control as traffic channels are allocated to new calls.

6. The method of claim 3, wherein the solution for the traffic channel power directed to a mobile user at the cell edge of said CDMA system is used to initialize a forward link closed loop power control as traffic channels are allocated to new calls.

7. The method of claim 1, wherein said system of equations includes the following equations:

$$g_1 P_1 \div (N_m + I_T) = \rho_1,$$

$$g_2 P_2 \div (N_m + I_T) = \rho_2,$$

$$g_3 P_3 \div (N_m + I_T) = \rho_3,$$

$$g_4 P_4 \div (N_m + I_T) = \rho_4,$$

$$I_T = K_f P_t / L,$$

$$P_t = P_1 + P_2 + N_p P_3 + K_{traf} M \alpha P_4, \text{ wherein,}$$

| | | |
|---|---|---|
| $P_1$ | = | Transmitter power for the pilot channel, |
| $P_2$ | = | Transmitter power for the synchronization channel, |
| $P_3$ | = | Transmitter power for a paging channel, |
| $N_p$ | = | Number of active paging channels, |
| $P_4$ | = | Transmitter power for a traffic channel directed to user at the cell edge, |
| $M$ | = | Number of active traffic channels, |
| $P_t$ | = | Total forward link transmitter power, |
| $L$ | = | Net link loss, including propagation, antenna gain, cable loss, etc., |
| $N_m$ | = | Noise power in mobile receiver bandwith, |
| $K_f$ | = | Forward link interference factor, |
| $K_{traf}$ | = | Forward link traffic channel power control factor, |
| $I_T$ | = | Total forward link interference power at the cell edge, |
| $\alpha$ | = | Average voice activity factor for the traffic channels, |
| $\rho_1$ | = | Required pilot channel chip energy-to-noise density ratio, including margin, |
| $\rho_2$ | = | Required sync channel bit energy-to-noise density ratio, including margin, |
| $\rho_3$ | = | Required paging channel bit energy-to-noise density ratio, including margin, |
| $\rho_4$ | = | Required traffic channel bit energy-to-noise density ratio, including margin, |
| $g_1$ | = | Pilot channel spread spectrum processing gain ( = 1 in IS – 95 system), |
| $g_2$ | = | Sync channel spread spectrum processing gain ( = 1024 in IS – 95 system), |
| $g_3$ | = | Paging channel spread spectrum processing gain ( = 256 in IS – 95 system), |
| $g_4$ | = | Traffic channel spread spectrum processing gain ( = 128 in IS – 95 system). |

8. The method of claims 1, wherein said system of equations includes the following system of equations:

$$g_1 P_1 \div (N_m + I_T) = \rho_1, \tag{16}$$

$$g_2 P_2 \div (N_m + I_T) = \rho_2, \tag{17}$$

$$g_3 P_3 \div (N_m + I_T) = \rho_3, \tag{18}$$

$$g_4 P_4 \div (N_m + I_T) = \rho_4, \tag{19}$$

$$I_T = I_{other} + K_{same} P_t / L, \tag{20}$$

$$P_t = P_1 + P_2 + N_p P_3 + K_{traf} M \alpha P_4, \tag{21}$$

wherein $I_{other}$ is a measurement or estimate of the other-cell interference power at the edge of the cell.

9. The method of claim 1, wherein said system of equations includes the following system of equations:

$$g_1 P_1 \div (N_m + I_T) = \rho_1, \tag{24}$$

$$g_2 P_2 \div (N_m + I_T) = \rho_2, \tag{25}$$

$$g_3 P_3 \div (N_m + I_T) = \rho_3, \tag{26}$$

$$I_T = K_f P_t / L, \tag{27}$$

$$P_t = P_1 + P_2 + N_p P_3 + P_{tt}, \tag{28}$$

where $P_{tt}$ is a measurement or estimate of the total traffic channel power.

10. The method of claim 1, wherein said system of equations includes the following system of equations:

$$g_1 P_1 \div (N_m + I_T) = \rho_1 \tag{32}$$

$$g_2 P_2 \div (N_m + I_T) = \rho_2 \tag{33}$$

$$g_3 P_3 \div (N_m + I_T) = \rho_3 \tag{34}$$

$$I_T = I_{other} + K_{same} P_1 / L \tag{35}$$

$$P_t = P_1 + P_2 + N_p P_3 + P_{tt}. \tag{36}$$

* * * * *